UNITED STATES PATENT OFFICE.

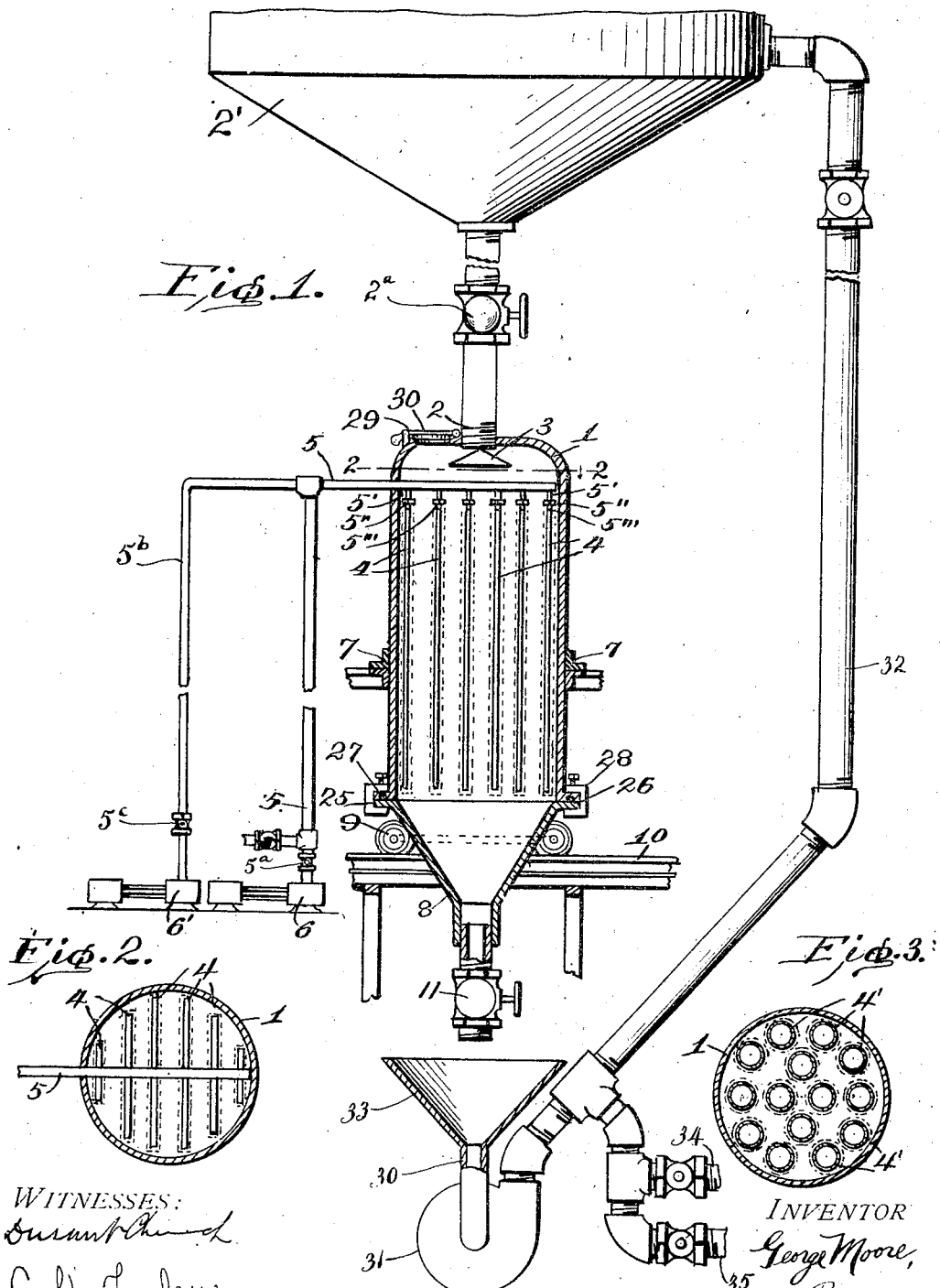

GEORGE MOORE, OF JOPLIN, MISSOURI.

FILTER.

1,007,592.  Specification of Letters Patent.  Patented Oct. 31, 1911.

Original application filed February 20, 1904, Serial No. 194,585. Divided and this application filed January 17, 1908. Serial No. 411,288.

*To all whom it may concern:*

Be it known that I, GEORGE MOORE, a citizen of the United States, residing at Joplin, in the county of Jasper and State of Missouri, have invented certain new and useful Improvements in Filters; and I do hereby declare the following to be a full, clear, and exact description of the invention, such as will enable others skilled in the art to which it appertains to make and use the same.

My invention relates to improvements in filtering apparatus, and particularly to the type now commonly known as the Moore filter which is the subject of my Patent No. 748,088, dated Dec. 29, 1903.

In the accompanying drawing:—Figure 1 represents a longitudinal, vertical, central section through a filter embodying the features of the present invention. Fig. 2 represents a transverse, sectional view of the same, taken on the plane of line 2, 2 of Fig. 1. Fig. 3 represents a similar view of a modified form of the same.

Referring to the drawing by numerals, 1 indicates a pressure chamber which is provided at its upper end with a supply pipe 2 having a suitable spreader 3 positioned beneath the discharge end of said pipe. A valve 2ª is disposed in the length of pipe 2 for controlling, and at times shutting off, the supply to chamber 1. Suitably supported within the chamber 1 are filtering plates 4, 4 spaced apart and arranged to cover as great an area within said chamber as practicable. Each of the plates 4 may be made up in any preferred manner so as to present a filtering surface with an interior space communicating with a common discharge pipe 5, which in turn communicates with any suitable pump 6 designed for effecting a drawing action through said pipe during a part of the operation, and by branch pipe 5ᵇ with pump 6' for passing a reverse current through said filter during the discharge of the solids collected thereon, as will hereinafter fully appear. Valve 5ᵃ is disposed in the length of pipe 5 for controlling communication with pump 6, and pipe 5ᵇ connects with pipe 5 between the valve 5ᵃ and the filter plates. A valve 5ᶜ is disposed in the branch 5ᵇ to control communication thereof with pump 6'. The chamber 1 is mounted upon any suitable, fixed brackets 7, 7 and retained by the same in a given position. A preferably funnel-shaped head or discharge door 8, having an annular, outwardly extending flange 25, normally closes the lower end of the chamber 1, said chamber 1 being formed at its lower end with a similar flange 26, and said head rests upon any suitable carriage 9 positioned to travel upon tracks 10, said head being arranged to slide beneath the lower end of said chamber 1 and being free to move from beneath the same whenever desired. A suitable, annular packing or gasket 27 is preferably carried by the flange 26, and said flanges 25 and 26 are adapted, when the parts are in the position indicated in Fig. 1, to be locked together by means of the clamps 28. The lower end of the tapered or funnel-shaped head 8 is provided with any suitable controlling valve 11 for preventing the discharge of the materials within the chamber when desired. As will be observed by reference to Fig. 3, the plates 4 may be substituted by tubular filters 4' in any suitable number and arranged for facilitating the drawing of material through the filtering medium carried by said tubes.

In operation, the metal bearing pulp is introduced under pressure through the pipe 2 from pressure tank 2' into the chamber 1, such pressure being sufficient for forcing the liquids from said pulp through filter plates 4 or tubes 4', until the said plates or tubes, as the case may be, become coated with solids, as indicated in dotted lines in the drawing, said coating never being permitted to become thick enough to entirely close the spaces between the several plates or between the plates or tubes and the contiguous walls of chamber 1. At this point, the surplus pulp is allowed to flow out through valve 11, the vacuum pump being brought into operation for holding the slime cakes in position on the filter surfaces, and a dissolving fluid is introduced through the pipe 2, followed by a cleansing fluid, as water, and the vacuum pump 6 continues its operation until the desired amount of such fluids is drawn through the solids and the filtering medium, and out through pipe 5, the said fluids being introduced under such head of pressure if desired as to be forced through the filters independently of the action of pump 6. This operation may be continued with either or both of said fluids until the solids being treated have been impoverished to the desired degree, the valve 11 being opened for permitting the excess liquids within the chamber 1 to escape at the close of each operation, and said valve being closed for the next operation. The drawing action through pipe 5 is continued during the escape of the liquid through the valve 11 and also while head 8 is being moved along the track 10. As soon as head 8 has been removed from beneath chamber 1, the pumping action is stopped, and air is permitted to enter the filter plates 4 through the pipe 5 either under pressure or not, as may be desired. If desired, air is introduced under pressure from pump 6', and the solids will fall from the filtering medium into any suitable receptacle below. However, it is not absolutely necessary that the air introduced should be under pressure, for the reason that the weight of the solids clinging to the filtering medium is usually sufficient to cause such solids to drop from the filters when released by the admission of atmosphere, and consequent relief of vacuum within the filters. After the solids have been discharged, the head is returned to its former position, and the operation may be repeated. By this structure I am enabled to remove all, or substantially all of, the precious metals from slimes in the most expeditious manner while facilitating the disposition of the solids after their cleansing.

During the operation, as above set forth, it is found that, unless some means are provided to prevent clogging of the heavier substances within the bottom head 8, the settling of sands during one operation will be sufficient for filling such bottom and closing up the spaces between the plates 4 at their lower ends, and, in order to prevent such clogging, I contemplate leaving the valve 11 slightly open during the building up of the cakes or coatings of solids on the filter plates, not, however, to a sufficient extent for relieving the pressure within the chamber 1, whereby the settled portions of solids will be removed as the same descend into the bottom 8. Of course, the portions that are discharged in this manner through valve 11 may be returned to the original source of supply for further treatment. That is to say, the discharged slimes may be directed back to the chamber 1 by any suitable conveyer, as by a return pipe 30 extending from below the valve 11 to a force pump 31 which communicates by a pipe 32 with the tank 2'. A funnel 33 may receive the discharge and deliver the same to the pipe 30. The pipe 32 is preferably branched as at 34 and 35 for facilitating suitable disposal of the discharged dissolving fluid and cleansing fluid respectively.

It is to be observed that the outflow through pipe 5 and the discharge from the bottom of the chamber 1 combined with the introduction of pulp into the chamber under pressure will keep the pulp in the chamber in movement, such movement being sufficient to maintain the fluid portion of the pulp in a condition adapting it for advantageous filtration. Obviously, though some of the heavier sands may drop to the bottom of the chamber, no pronounced line of stratification will appear owing to the movement of the free pulp, and cakes will be built up on the filtering material possessing substantially uniform resistance to the passage therethrough of fluid. It is also to be noted that the filtering tubes or plates are so arranged that the cakes of solids built up thereon will not adhere to the walls of the chamber, but will readily fall from the chamber when freed from the filtering medium. The clamps 28 serve as jacks for drawing the bottom head 8 up into close contact with the packing or gasket 27. Obviously when the bolts or clamps 28 are threaded for pressing against flange 26, the bent members of said clamps will act as follower means which will exert pressure on bottom 8 and on the bolts of the clamps simultaneously in opposite directions.

This application is a division of my original application filed Feb. 20, 1904, and designated by Serial No. 194,585, and patented April 19, 1910, No. 955,836.

What I claim is:—

1. A filtering apparatus comprising a tank, inclosed filtering cells, a suction pump connected thereto, a pulp distributer at the top of the tank, a removable bottom for the tank, means for clamping the bottom relative to the tank, and means for delivering material discharged from the bottom to the pulp distributer.

2. In a filtering apparatus, the combination of a filtering tank with inclosed filtering cells, a suction pump connected thereto, a removable bottom for the filtering tank, a pulp supply tank, means for delivering material discharged from the bottom to the pulp supply tank, a pulp distributer at the top of the tank, and a pipe supply communicating with said pulp tank and positioned for delivering pulp to said distributer.

3. In apparatus of the nature indicated, the combination of the filter or receptacle constructed with a bottom door, a plurality of filter plates suspended in said receptacle, each of said filter plates communicating with a common discharge or outlet pipe for the filtered liquid, a valve for closing said common outlet, a branch pipe communicating with the outlet pipe between the plates and valve and a valve located in said branch pipe, said branch pipe communicating with a source of supply of fluid under pressure for passing through the filtering media a fluid in the reverse direction to the filtering flow, substantially as described.

4. In apparatus of the nature indicated, the combination of the filter or receptacle constructed with a bottom door, a plurality of filter plates suspended from the top of said receptacle, each of said filter plates communicating with a common discharge or outlet pipe for the filtered liquid, an inlet pipe for introducing into the receptacle the mixture to be separated, a valve on said inlet pipe for shutting off the supply, and means for passing a cleansing fluid through the cakes of solid matter deposited on the filter plates.

5. In apparatus of the nature indicated, in combination the filter or receptacle fitted with a removable bottom discharge door, a plurality of filter plates, said plates being constructed with ports or passages placing them in communication with a common outlet pipe for the separated liquid, a valve in said outlet pipe, a branch pipe communicating with said outlet pipe between the filter and valve, a valve fitted in said pipe through which a quantity of a fluid can be admitted to the filter in the reverse direction to that of the filtering flow for removing the solid matter from the surface of the filtering material, a feed pipe for introducing the mixture into the receptacle, a valve in said feed pipe for shutting off the supply, a drain pipe communicating with the bottom, said drain pipe being fitted with a valve for drawing off any of the mixture that remains in the filter after the supply valve is closed, and means for passing a wash water or solution through the cakes of the solid matter on the surfaces of the filtering material.

6. In apparatus of the nature indicated, the combination with the filter or receptacle provided with a bottom discharge door, of a plurality of filter plates suspended from the top of said receptacle in such manner that the discharging of said receptacle may be effected through the bottom without necessitating the removal of the filter plates, said filter plates being so positioned as to leave space for solid matter deposited on their surfaces and between such surfaces and the inside of the receptacle around said plates.

7. In apparatus of the nature indicated, the combination with the receptacle fitted with the bottom discharge door, filter plates arranged and secured in said receptacle in such a manner that the discharging of said receptacle can be effected through the bottom without necessitating the removal of the filter plates, said filter plates being so positioned as to leave space for solid matter deposited on their surfaces and between such surfaces and the inside of the receptacle around said plates, and means for passing through the filtering media a fluid in the reverse direction to that of the filtering flow.

8. In apparatus of the nature indicated, the combination with the receptacle fitted with the bottom discharge door of a plurality of filter plates constructed and arranged in said receptacle in such a manner that the discharge may be effected without necessitating the removal of said filter plates, said filter plates being so arranged as to leave space for solid matter deposited on their surfaces and between such surfaces and the inside of the receptacle around the edges of the plates, means for draining off any of the mixture remaining in the receptacle after the cakes are formed, means for passing through the filtering media and cakes of solid matter deposited thereon, a water wash or weak solution, and means for passing through the filtering media a fluid in the reverse direction to that of the filtering flow to detach the solid matter.

9. In an apparatus of the character described, the combination of a stationary filter tank, a bottom therefor of hopper-like form, and co-acting locking means between said bottom and the tank whereby the bottom is removably attached to the tank, said locking means including projections on the tank, and means for clamping the bottom against the open end of the tank.

10. In an apparatus of the character described, the combination with a filtering tank and a hollow filtering medium contained therein, and upon the outer sides of which the solid material accumulates a cake form, of a removable bottom for said tank, said bottom being independent of the filter and adapted to uncover the bottom of the tank to allow the accumulated solid matter to be delivered by gravity from the tank, and securing means for the bottom, said means including projections on the tank, and means for clamping the bottom against the open end of the tank.

11. In an apparatus of the character described, the combination of a stationary tank, a pressure filter supported therein, a removable hopper-like bottom for the tank, and detachable connections between the tank and bottom, said connections comprising a flange on the tank and clamping means for seating the bottom against said flange.

12. In a filter, the combination with a chamber and means for supplying material thereto under pressure, of a filtering medium arranged in said chamber, a bottom for the chamber, one of the two last-recited elements being movable with respect to the other, means for causing the solids of the material being filtered to remain in engagement with said filtering medium during movement of said movable element, and means for releasing such material for permitting the discharge thereof from said filtering medium.

13. In a filter, the combination with a chamber, of a filtering medium within the same, means for introducng material to be filtered into said chamber, means for passing the liquid from said material through the filtering medium under pressure, an element movable away from said chamber and adapted to facilitate removal of the solids from the chamber, and means for sustaining such solids in contact with said filtering medium during movement of said movable element.

14. In a filter, the combination with a chamber, a removable member closing one end thereof, and a filter within said chamber, of means for supplying material to be filtered to said chamber under pressure, means for draining off the excess of liquids from said chamber after a filtering operation, and means for retaining the solids collected on said filtering medium in position thereon during a removal of said movable member.

15. In a filter, the combination with a chamber, of vertically disposed filtering cells within the same, means for introducing material to be filtered into said chamber, means for passing liquid from such material through the filtering medium and leaving solids on the surface of the filtering medium, an element forming part of the chamber and movable laterally beyond the main portion of the chamber designed to facilitate removal of the solids from said chamber, means for guiding the lateral movement of said movable element, and means for retaining the solids on the filtering medium during removal of said movable element.

16. In a filter, the combination with a chamber and means for supplying material under pressure to said chamber, filtering medium arranged within said chamber, a bottom for said chamber shiftable away from the chamber, a discharge opening formed in said bottom, and means for drawing liquid material from said chamber through said filtering medium.

In testimony whereof I affix my signature in presence of two witnesses.

GEORGE MOORE.

Witnesses:
HENRY B. HAIGH,
ANDREW J. EWALD.